(12) United States Patent
Chen et al.

(10) Patent No.: US 7,414,091 B2
(45) Date of Patent: Aug. 19, 2008

(54) TWO-PART ACRYLIC-URETHANE ADHESIVE

(75) Inventors: Mai Chen, Hoffman Estates, IL (US); Christine M. Zack, Crystal Lake, IL (US); Katherine Sue Rice, Glenside, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/529,033

(22) Filed: Sep. 28, 2006

(65) Prior Publication Data

US 2007/0072992 A1  Mar. 29, 2007

Related U.S. Application Data

(60) Provisional application No. 60/721,247, filed on Sep. 28, 2005.

(51) Int. Cl.
*C08G 18/08* (2006.01)

(52) U.S. Cl. ..................................................... 524/589

(58) Field of Classification Search ................... 524/589
See application file for complete search history.

(56) References Cited

U.S. PATENT DOCUMENTS

| | | | |
|---|---|---|---|
| 4,491,646 A | 1/1985 | Gruber et al. | |
| 4,609,690 A | 9/1986 | Gruber et al. | |
| 4,618,390 A | 10/1986 | Powell | |
| 5,159,011 A | 10/1992 | Rau et al. | |
| 5,747,166 A | 5/1998 | Schwarte et al. | |
| 6,586,521 B2 | 7/2003 | Blum et al. | |
| 6,706,801 B1 | 3/2004 | Blum et al. | |
| 2003/0022979 A1 | 1/2003 | Chen et al. | |
| 2003/0220462 A1 | 11/2003 | Porzio | |

FOREIGN PATENT DOCUMENTS

EP  1279712  1/2003

*Primary Examiner*—Mark Eashoo
*Assistant Examiner*—Noah Frank
(74) *Attorney, Agent, or Firm*—Kenneth Crimaldi

(57) ABSTRACT

A two-component bonding agent composition of an aqueous component having a polyol and an acrylic-styrene polymer, and an isocyanate component having a water dispersible polyisocyanate.

10 Claims, No Drawings

TWO-PART ACRYLIC-URETHANE ADHESIVE

This application claims the benefit of priority under 35 U.S.C. § 119(e) of U.S. Provisional Patent Application No. 60/721,247, filed on Sep. 28, 2005, the disclosure of which is incorporated herein by reference.

The present invention relates to a two-part acrylic-urethane adhesive employing a water-based acrylate/urethane hybrid composition. The invention is particularly suited for use as a laminating adhesive and is suitable, for example, for laminating flexible films, aluminum foil and other substrates.

Solvent-based polyurethane has been widely used as a laminating adhesive to achieve good heat and moisture resistance. In recent years it has become desirable to expand the selection of commercially available bonding agents (including, for instance, adhesives and primers) to meet the ever-rising number of new technological applications. The desire to reduce chemical solvent emissions and to improve ease of handling has driven the demand for improved water-based bonding agent systems. One such system that has been popular in widespread applications is a latex system; that is, a water-based dispersion or emulsion. Particularly attractive have been acrylic latex systems.

Efforts have been made to improve the performance of acrylic latex systems used as laminating adhesives. The most commonly used approach is to crosslink an acrylic latex with a water-dispersible polyisocyanate. For example, U.S. Pat. Appl. Publ. 2003/0022979 discloses a water-based acrylate/urethane hybrid composition. However, it is desirable to provide alternative water-based bonding agent systems having improved performance characteristics and useful on a broader variety of substrates, including plastic films and metal foils. The problem addressed by this invention is to provide such a system.

STATEMENT OF THE INVENTION

The present invention is directed to a two-component bonding agent composition, comprising: (a) a first component which is an aqueous mixture whose solid portion comprises: (i) 0.1 to 10% of a polyol containing at least two hydroxyl groups and being selected from the group consisting of water dispersible polyether polyols, polyester polyols, polyether polyester polyols and mixtures thereof, and (ii) 90 to 99.9% of a polymer having from 20-60% residues of at least one styrene monomer, from 40-80% residues of at least one acrylic monomer having a Tg less than 0° C., from 1-4% residues of (meth)acrylic acid and less than 0.5% residues of hydroxyl-containing monomers; and (b) a second component comprising a water dispersible polyisocyanate; wherein said second component is present relative to said first component at a NCO/NCO-reactive group molar ratio of 1:1 to 8:1. The invention is further directed to a process for producing a coating on a substrate. The process comprises applying a layer of the bonding agent composition.

DETAILED DESCRIPTION OF THE INVENTION

The composition and method of the present invention allow lamination of two or more flexible or rigid substrates. This invention relates to a two-part, aqueous adhesive composition which is hydrophobic and contains aromatic monomer residues. Part one comprises a copolymer of a styrene-type monomer, a hydrophobic acrylic monomer and a carboxyl functional acrylic monomer. The content of hydroxy functional acrylic monomers is severely limited in this invention. Water dispersible or water soluble polyol is blended into part one to provide hydroxy groups for crosslinking with part two, which comprises a water dispersible polyisocyanate.

The two parts are mixed prior to contacting a surface (such as when applied on a laminating machine). The adhesive is applied to one substrate and preferably dried through an oven before another layer of substrate is applied. The laminate preferably is then cured at ambient temperature. The polyol in the latex preferably cures with the polyisocyanate to form a hybrid system of an acrylic copolymer and a urethane. The copolymer helps to achieve the desired heat and moisture resistance at elevated temperature.

The resulting bonding agent exhibits excellent heat, chemical and environmental resistance, as well as adhesion over a wide range of temperatures (e.g., preferably from at least −10° C. to +120° C.) and humidities. The bonding agent preferably has a useful pot life after mixing of more than 8 hours, and is easy to handle and apply. The bonding agent is contacted with a first substrate and a second substrate is also contacted with the bonding agent to form a laminate. The bonding agent has excellent mechanical stability at high speed.

All percentages mentioned herein are by weight, and temperatures in ° C., unless specified otherwise. As used herein, "bonding agent" is an agent that is suitable for joining itself to at least a first material, and preferably also to a second material. The first and second materials may be the same or different. Multiple layers of material may be joined using the bonding agent. "Bonding agent" encompasses an adhesive, a primer, or any other suitable coating for bonding to a surface. As used herein the terminology "(meth)acrylate" refers to acrylate or methacrylate. "Latex" or "latex composition" refers to a dispersion of a water-insoluble polymer which may be prepared by conventional polymerization techniques such as, for example, by emulsion polymerization. The term "acrylic monomer" means acrylonitrile (AN); acrylamide (AM) and its N-substituted derivatives; acrylic acid (AA), methacrylic acid (MAA), and their esters; and itaconic acid (IA). Esters of AA and MAA include, but are not limited to, methyl methacrylate (MMA), ethyl methacrylate (EMA), butyl methacrylate (BMA), ethylhexyl methacrylate (EHMA), lauryl methacrylate (LMA), hydroxyethyl methacrylate (HEMA), methyl acrylate (MA), ethyl acrylate (EA), butyl acrylate (BA), isobutyl acrylate (IBA), ethylhexyl acrylate (EHA) and hydroxyethyl acrylate (HEA), as well as other esters of AA or MAA. The term "styrene monomer" means an ethylenically unsaturated monomer substituted with an aromatic group, preferably styrene (Sty) and substituted styrenes, e.g., α-methylstyrene (AMS).

The aqueous mixture which is the first component of this invention preferably is a latex, which is a water-based dispersion of particles of a polymer of ethylenically unsaturated monomers. Other than acrylic and styrene monomers, suitable monomers might include, for example, vinyls (e.g., acetates, such as vinyl acetate, ethylene vinyl acetate; alcohols; chlorides such as polyvinyldichloride, polyvinyl chloride; or the like). The latex will typically exhibit a viscosity ranging from about 10 to 1000 cps and more preferably from 20 to 500 cps. The solids content in the latex may range from 5 to 95%. More preferably it ranges from 20 to 80%, still more preferably from 30 to 70%, and even still more preferably it ranges from 40 to 60%. In one embodiment, the polymer of the latex has a weight average molecular weight of between 5000 and 2,000,000 and more preferably between 100,000 and 2,000,000.

The polymer has from 20-60% residues of at least one styrene monomer, preferably no more than 50%. In one embodiment of the invention, the polymer has from 23-45% residues of at least one styrene monomer, preferably styrene. The polymer has from 40-80% residues of at least one acrylic monomer having a Tg less than 0° C. Preferably, the polymer has from 50-80% residues of at least one $C_4$-$C_{12}$ alkyl acrylate ester monomer. In one preferred embodiment, the $C_4$-$C_{12}$ alkyl acrylate ester monomer(s) is BA, EHA, IBA, LMA, or combinations thereof.

The polymer has from 1-4% residues of (meth)acrylic acid. Preferably, the polymer has from 1-3% residues of (meth)acrylic acid, and most preferably from 1.5-2.5%. Preferably, the (meth)acrylic acid residues in the polymer are residues of acrylic acid.

The polymer has less than 0.5% residues of hydroxyl-containing monomers. Preferably, the polymer has less than 0.3% of such residues, more preferably less than 0.2%, and most preferably the polymer is substantially free of residues of hydroxyl-containing monomers. Examples of hydroxyl-containing monomers include, e.g., HEMA, HEA, vinyl alcohol, hydroxypropyl methacrylate (HPMA) and hydroxypropyl acrylate. Preferably, the polymer is substantially free of amino-containing monomers. Preferably, the polymer has less than 0.5% of isocyanate-reactive groups other than carboxylic acid groups, more preferably less than 0.2%, and most preferably, the polymer is substantially free of isocyanate-reactive groups other than carboxylic acid groups.

The polymer latex is mixed with a water dispersible polyol to provide hydroxyl functionality. A water dispersible polyol is one which will form a solution or emulsion in water at room temperature with agitation at any amount in the range 1-50%. The polyol may be a polyether polyol, a polyester polyol, polyester polyether polyol or a mixture thereof. A polyol will have multiple hydroxyl functionality and thus will contain at least two hydroxyl groups. Preferred polyols are selected from diols, triols or mixtures thereof. The polyol is sufficiently nonvolatile that it will be fully or at least partially available for reaction with the isocyanate during mixing operations. The polyol also is water soluble or water dispersible. Preferably the polyol will have a number average molecular weight from 100 to 7500, more preferably 150 to 5000, and still more preferably from 200 to 1000. In one embodiment, the molecular weight is less than 1500 and still more preferably less than 600. An example of a highly preferred polyol is polypropylene glycol (PPG), such as 400 MW polypropylene glycol. The polyol is provided in an amount of from 0.1-10% of the solid portion of the first component. Preferably the amount of polyol is no more than 5%, more preferably no more than 3%, still more preferably no more than 2%, and most preferably no more than 1.5%. Preferably, the amount of polyol is at least 0.3%, more preferably at least 0.4%, and most preferably at least 0.6%. The solid portion of a component is the non-volatile portion, typically comprising polymers and other non-volatile additives, e.g., surfactants, pigments, flame retardants; and excluding water and other solvents.

It will be appreciated that surfactants may be employed as desired in the bonding agent composition of the present invention (e.g., for use in emulsion or dispersion polymerization) to provide stability, as well as to control particle size. Conventional surfactants include anionic or nonionic emulsifiers or their combination. Typical anionic emulsifiers include, but are not limited to alkali or ammonium alkyl sulfates, alkali or ammonium alkylether sulfates, alkali or ammonium alkylarylether sulfates, alkyl sulfonates, salts of fatty acids, esters of sulfosuccinic acid salts, alkyl diphenylether disulfonates, and salts or free acids of complex organic phosphate esters. Typical nonionic emulsifiers include, but are not limited to polyethers, e.g. ethylene oxide and propylene oxide condensates which include straight and branched chain alkyl and alkylaryl polyethylene glycol and polypropylene glycol ethers and thioethers, alkyl phenoxy-poly(ethyleneoxy) ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides. Surfactants may be employed in the polymer compositions of the present invention at levels of 0.1 to 3 wt. % or greater, based on the total weight of the final composition.

The polyisocyanate employed may be any suitable polyisocyanate, but preferably it is an aliphatic polyisocyanate, an aromatic polyisocyanate or a mixture thereof. Preferably, the polyisocyanate is a diisocyanate. Examples of suitable polyisocyanates include those based on toluene diisocyanate (TDI), isophorone diisocyanate (IPDI), hexamethylene diisocyanate (HDI), diphenyl methane diisocyanate (MDI), dicyclohexyl methane diisocyanate (HMDI), isomers thereof or mixtures thereof. Prepolymers of a polyisocyanate and a polyol may also be employed. Aliphatic polyisocyanates are especially preferred. The polyisocyanate is water soluble or dispersible, i.e., it will form a solution or emulsion in water at room temperature with agitation at any amount in the range 1-50%.

The relative proportions of isocyanate groups to isocyanate-reactive groups may vary as desired, within a molar ratio of NCO/NCO-reactive groups of 1:1 to 8:1. NCO-reactive groups include, e.g., hydroxyl, amino and carboxyl groups. Preferably, the NCO/NCO-reactive group molar ratio is at least 3:1. Preferably, the NCO/NCO-reactive group molar ratio is no more than 5:1. In one preferred overall mixture including polyol, polyisocyanate and latex, the polyisocyanate is provided in an amount up to 0.01 to 0.8 (and more preferably 0.1 to 0.3) parts polyisocyanate to 1 part solids in the latex, with the polyol present in the above preferred proportions relative to the isocyanate groups. The pH of the resulting overall mixture preferably is 5 to 9 and more preferably is 6 to 8.

Other optional components of the compositions of the present invention include, but are not limited to, agents selected from co-solvents, coalescing agents, pigments or other colorants, fillers, reinforcement (e.g., fibers), dispersants, wetting agents, waxes, catalysts, blowing agents, antifoam agent, UV absorbers, flame retardants, adhesion promoters, antioxidants, biocides, coalescing agents, or stabilizers. These optional components (as desired) may be added in any order of addition that does not cause an incompatibility between components. Components that do not dissolve in the aqueous carrier (such as pigments and fillers) can be dispersed in the latex or an aqueous carrier or co-solvent using a mixer (optionally a high shear mixer). The pH of the composition can be adjusted by adding acid or base, with agitation. Examples of base include, but are not limited to ammonia, diethylamine, triethylamine, dimethylethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

As gathered from the foregoing, the system of the present invention contemplates the employment of two components, which preferably are mixed using a suitable mixer (e.g., an electrically, pneumatically, or an otherwise powered mechanical mixer) prior to or during application to a substrate to form the bonding agent. Thus, the latex/polyol admixture typically will be packaged separately from the polyisocyanate. Mixing may take place at any suitable time in the process, such as before, during, or as a result of the application process. All of the present steps may be carried out under ambient room temperature conditions. As desired, heating or cooling may be employed.

The bonding agent of the present invention is useful for bonding substrates together. The substrates may be similar material or dissimilar material. Though wet lamination processes are possible, preferably the bonding agent is particularly useful for dry bond lamination of a plurality of substrate layers. In a preferred embodiment, a layer of the bonding agent is applied to a first substrate layer, water is removed (e.g., with heated air or otherwise), and the resulting dried bonding agent layer is covered with a second substrate layer to form a laminated article wherein the two substrates are bonded together by the dried layer of bonding agent. In a preferred embodiment, the substrate layers are provided in the form of rolls of substrate material. The sheets may be on the order of 1 to 10 mils in thickness. Larger thicknesses are also possible, as are smaller thicknesses (e.g., on the order of 1 or more microns).

The compositions of the present invention can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations. Once applied to the substrate, the compositions are dried, such as by application of heat and air flow, or some other suitable approach for removing substantially all remaining water.

The present invention benefits from advantageously long pot lives of the bonding agent. Thus, after the components of the bonding agent are mixed, it is contemplated that several hours may be permitted to elapse before application to a substrate. For example, in one embodiment the useful life is at least 8 (and more preferably at least 12 to 24) hours and thus at least eight hours may elapse before application to a substrate.

The bonding agent compositions may find other suitable application as top coats, or other intermediate coats, thus rendering them potentially useful in paints, inks, plastics, or the like. The bonding agent compositions of the present invention can be used on a wide variety of one or a plurality of suitable substrates such as high, low or medium density plastics (for example, of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated substrates, wax coated paperboard, cardboard, particle board, textiles, leather, and metal (aluminum, ferrous as well as other non-ferrous), metallized plastics (e.g., metallized plastic film) or the like. The bonding agent is particularly attractive for packaging and sealing applications. For example, in one aspect, a plastic film, metal film, or metallized plastic film is laminated (e.g., over all or at least a portion of its surface, such as along its edges, or at intermittent locations) with the bonding agent of the present invention. In one such application, food may be packaged for boil-in-bag preparation, or the resulting laminate might be used for sealing or packaging some other article.

EXAMPLES

Example 1

The latex was made by a conventional free radical polymerization method with 160 g styrene, 232 g 2-ethylhexyl acrylate and 8 grams of acrylic acid at 50% solids in water. 4 g of polypropylene glycol ($M_w$=400) was added in to the mixture after reaction. The pH of the latex was then raised to 7 with ammonia. 2 gram of water dispersible isocyanate (NCO=17%) was added into 100 gram of latex before application.

The adhesive mixture was coated on aluminum foil at 1.5 lb/rm coating weight then dried in an oven. A 1 mil high slip low density polyethylene (HSLDPE) film was laminated to the coated foil to get the foil/HSLDPE laminate. The laminate was left at ambient temperature for one week for curing. A pouch made from the laminate was filled with water and left in boiling water for 30 minutes. 1,200 g/in adhesion was achieved with film destruct bond.

Example 2

Example 2 was prepared the same way as Example 1 except the acrylic monomer composition was 112 g styrene, 280 g butyl acrylate and 8 g acrylic acid. The adhesion after boiling test was 1,140 g/in.

Both Example 1 and 2 passed the boiling test with performance comparable to that of a conventional solvent-based polyester urethane adhesive.

Example 3 and 4

Effect of Hydroxyl Functional Monomers

Example 3 was prepared the same way as Example 1 except the acrylic monomer composition was 112 g styrene, 276 g butyl acrylate, 4 g acrylic acid and 8 g 2-hydroxy propyl methacrylate. The adhesion after the boiling test was 400 g/in.

Example 4 was prepared the same way as Example 1 except the acrylic monomer composition was 112 g styrene, 276 g butyl acrylate, 4 g acrylic acid and 8 g 2-hydroxy ethyl methacrylate. The adhesion after the boiling test was also 400 g/in.

Example 5+6

Effect of Polypropylene Glycol

Example 5 was prepared as the same way as Example 4 (with HEMA) except no polypropylene glycol was used. The adhesion after boiling decreased to 100-200 g/in with severe blisters.

Example 6 was prepared as the same way as Example 2 (without HEMA) except no polypropylene glycol was used. The adhesion after boiling decreased to 650-700 g/in.

The results demonstrate that omission of polypropylene glycol will decrease the adhesion, and that the combination of using HEMA and lack of polypropylene glycol further decreased the adhesion after the boiling test.

Example 7

The Effect of Styrene Monomer

Example 7 was the same as Example 2 except the styrene monomer was replaced with MMA monomer. The adhesion after boiling decreased to 400 g/in.

Example 8 and 9

The Effect of Hydrophilic Monomer EA

Example 8 was prepared the same way as Example 2 except the acrylic monomer composition was 40 g styrene, 352 g ethyl acrylate and 8 g acrylic acid. The adhesion after boiling test was 380 g/in with blister.

Example 9 was prepared the same way as Example 2 except the acrylic monomer composition was 80 g MMA, 280 g ethyl acrylate and 8 g acrylic acid. The adhesion after boiling test was 170 g/in with severe blister.

Both Example 8 and 9 had the same $T_g$ as Example 1 and 2. The hydrophilic monomer EA decreased the adhesion. The composition without styrene and with EA further decreased the adhesion after boiling.

Adhesion tests were performed by preparing one inch (2.54 cm) strips, cut from the laminate. T-peel adhesion was measured by instrument using conventional techniques and in accordance with ASTM D1876.

The laminates for adhesion and performance tests were made by coating the adhesive on a first substrate at 1.5 pounds (0.7 kg)/ream, drying the water by hot air, and laminating a second substrate to the first coated substrates.

The following results were obtained.

| Ex. | NCO | OH-func. monomer | AA | Sty | MMA | EHA | BA | EA | PPG-425 | Foil/HSLDPE 30 min boiling |
|---|---|---|---|---|---|---|---|---|---|---|
| 1 | 4.5 | | 2 | 40 | | 58 | | | 1 | 1,200 film stretch |
| 2 | 4.5 | | 2 | 28 | | | 70 | | 1 | 1,140 |
| *3 | 4.5 | 2 (HPMA) | 1 | 28 | | | 69 | | 1 | 400 |
| *4 | 4.5 | 2 (HEMA) | 1 | 28 | | | 69 | | 1 | 400 |
| *5 | 4.5 | 2 (HEMA) | 1 | 28 | | | 69 | | 0 | 100-200 blister |
| *6 | 4.5 | | 2 | 28 | | | 70 | | 0 | 650-700 |
| *7 | 4.5 | | 2 | | 27 | | 71 | | 1 | 400 |
| *8 | 4.5 | | 2 | 10 | | | | 88 | 1 | 380 blister |
| *9 | 4.5 | | 2 | | 10 | | | 88 | 1 | 170 blister |
| *10 | 0 | | 2 | 28 | | | 70 | | 1 | 40 tunnel |

*Comparative Examples

What is claimed is:

1. A two-component bonding agent composition, comprising:
   (a) a first component which is an aqueous mixture whose solid portion comprises: (i) 0.1 to 10 wt % of a polyol containing at least two hydroxyl groups and being selected from the group consisting of polyether polyols, polyester polyols, polyether polyester polyols and mixtures thereof; and (ii) 90 to 99.9% of a polymer having from 20-60% residues of at least one styrene monomer, from 40-80% residues of at least one acrylic monomer having a $T_g$ less than 0° C., from 1-4% residues of (meth)acrylic acid and less than 0.5% residues of hydroxyl-containing monomers; and
   (b) a second component comprising a water dispersible polyisocyanate,
   wherein said second component is present relative to said first component at a molar ratio of NCO/NCO-reactive groups of 1:1 to 8:1.

2. The composition of claim 1 wherein said polyol is polypropylene glycol.

3. The composition of claim 2 wherein said polyol has a molecular weight between about 200 and about 1,000.

4. The composition of claim 1 wherein said polymer has from 23-45% residues of styrene, from 55-75% residues of at least one $C_4$-$C_{12}$ alkyl acrylate ester monomer, from 1-3% residues of (meth)acrylic acid and less than 0.2% residues of hydroxyl-containing monomers; and wherein said polymer has a weight average molecular weight between 5000 and 2,000,000.

5. The composition of claim 4 wherein said polymer has from 1-3% residues of acrylic acid.

6. The composition of claim 5 wherein said polyol is polypropylene glycol having a molecular weight from 200 to 1,000.

7. The composition of claim 1 wherein said water dispersible polyisocyanate is selected from polyisocyanates based on toluene diisocyanate, isophorone diisocyanate, hexamethylene diisocyanate, diphenyl methane diisocyanate, dicyclohexyl methane diisocyanate, isomers thereof or mixtures thereof.

8. The composition of claim 1, wherein the molar ratio of NCO/NCO-reactive groups is from 3:1 to 5:1.

9. A process for making a laminated article wherein at least two substrate layers are bonded together by a layer of a bonding agent, comprising bonding said at least two substrate layers with the bonding agent composition of claim 1.

10. A process for producing a coating on a substrate; said process comprising applying a layer of the bonding agent composition of claim 1.

* * * * *